United States Patent
Braunheim et al.

(10) Patent No.: US 8,636,900 B2
(45) Date of Patent: Jan. 28, 2014

(54) FUEL FILTER

(75) Inventors: Michael Braunheim, Göppingen (DE); Matthias Gänswein, Esslingen (DE); Sven Siegle, Winnenden (DE); Jörg Hrodek, Mittlern (AT); Richard Wlassa, Stuggart (DE)

(73) Assignee: Mahle International GmbH (DE)

( * ) Notice: Subject to any disclaimer, the term of this patent is extended or adjusted under 35 U.S.C. 154(b) by 285 days.

(21) Appl. No.: 13/055,815

(22) PCT Filed: Jul. 14, 2009

(86) PCT No.: PCT/EP2009/058955
§ 371 (c)(1),
(2), (4) Date: Apr. 11, 2011

(87) PCT Pub. No.: WO2010/012584
PCT Pub. Date: Feb. 4, 2010

(65) Prior Publication Data
US 2011/0174718 A1    Jul. 21, 2011

(30) Foreign Application Priority Data

Jul. 26, 2008   (DE) .................. 10 2008 034 900

(51) Int. Cl.
*B01D 17/12* (2006.01)

(52) U.S. Cl.
USPC ........... 210/114; 210/171; 210/262; 210/313; 210/316; 210/502.1

(58) Field of Classification Search
USPC ............. 210/96.1, 312, 313, 418, 502.1, 694, 210/112, 114, 171, 262; 137/68.11; 138/89
See application file for complete search history.

(56) References Cited

U.S. PATENT DOCUMENTS

| | | | |
|---|---|---|---|
| 3,503,507 A | * | 3/1970 | Raupp et al. .................. 210/96.1 |
| 4,357,960 A | * | 11/1982 | Han ................................ 138/97 |
| 2003/0121860 A1 | * | 7/2003 | Harenbrock et al. ......... 210/660 |
| 2006/0118176 A1 | * | 6/2006 | Ring et al. ..................... 137/268 |
| 2006/0118478 A1 | | 6/2006 | Linhart et al. |
| 2010/0096304 A1 | | 4/2010 | Ganswein et al. |

FOREIGN PATENT DOCUMENTS

| | | |
|---|---|---|
| DE | 19605431 A1 | 8/1997 |
| DE | 10138695 A1 | 2/2003 |
| DE | 10302057 A1 | 7/2004 |
| DE | 102004036070 A1 | 2/2006 |
| DE | 102004059062 A1 | 6/2006 |
| DE | 102006039581 A1 | 3/2008 |
| DE | 102007039661 A1 | 3/2008 |
| GB | 2214446 A | 9/1989 |
| JP | 62-144715 | 6/1987 |
| WO | WO-2008/023029 A2 | 2/2008 |

OTHER PUBLICATIONS

English abstract for DE10138695.

(Continued)

*Primary Examiner* — Matthew O Savage
(74) *Attorney, Agent, or Firm* — Rader, Fishman & Grauer PLLC

(57) ABSTRACT

A fuel filter having a filter housing including at least one filter element. A water collection chamber configured to collect water separated out of the fuel. An active carbon filter is disposed downstream of the water collection chamber and a water-soluble dividing device is disposed between the water collection chamber and the active carbon filter and is impermeable or insoluble to fuel.

13 Claims, 1 Drawing Sheet

(56) References Cited

OTHER PUBLICATIONS

English abstract for DE10302057.
English abstract for DE19605431.
English abstract for DE102004036070.
English abstract for DE-102007039661.
English abstract for JP62144715.
English translation of JP OA for JP2011-519118 dated Aug. 20, 2013.

* cited by examiner

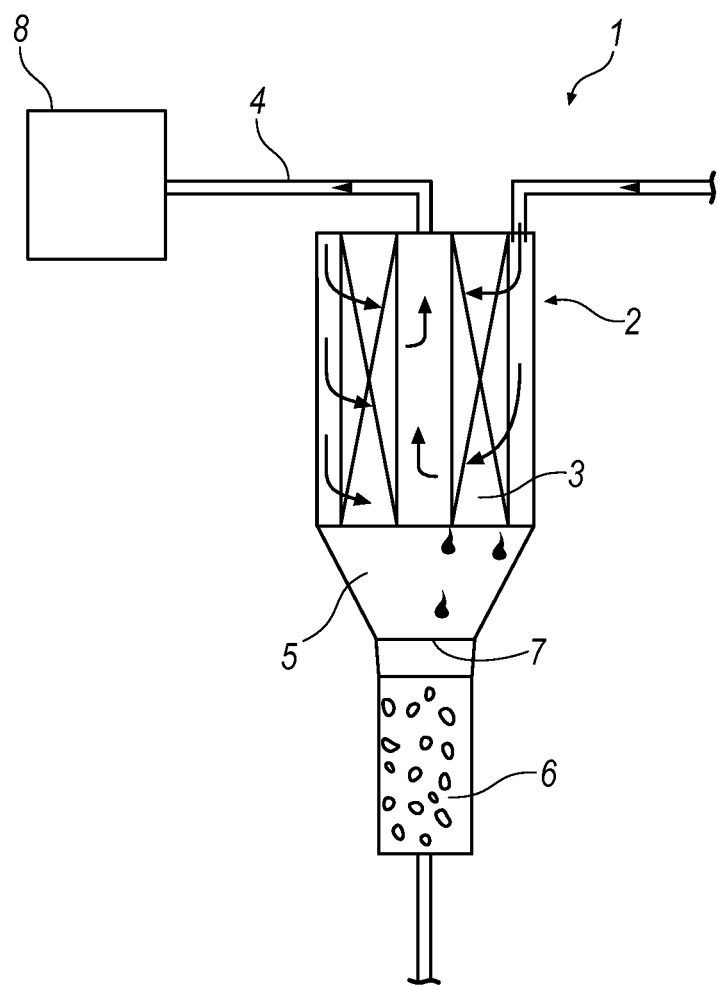

FUEL FILTER

CROSS-REFERENCES TO RELATED APPLICATION

This application claims priority to German patent application DE 10 2008 034 900.3 filed on Jul. 26, 2008, and PCT patent application PCT/EP/2009/058955 filed on Jul. 14, 2009, both of which are hereby incorporated by reference in their entirety.

TECHNICAL FIELD

The present invention relates to a fuel filter for an internal combustion engine of a motor vehicle, according to the preamble of claim 1. The invention also relates to a motor vehicle with an internal combustion engine which has such a fuel filter.

BACKGROUND

Fuel filters are currently found in virtually all motor vehicles and are used to clean the fuel before it is fed into a combustion chamber of an internal combustion engine. Such fuel filters often also have a water collection chamber in which water separated from the fuel can be collected and where necessary drained via a corresponding outlet. There is often an active carbon filter downstream of such water collection chambers, which filter is intended to prevent fuel fractions, that is, hydrocarbons, still present in the separated water from reaching the environment in an uncontrolled manner. The disadvantage of such fuel filters is however that at the start of operation fuel first flows through them completely, so that during initial startup the water collection chamber is usually filled with fuel too. If no valve device is provided between the water collection chamber and the upstream active carbon filter, the fuel can come into direct contact with the active carbon in the active carbon filter and saturate it. In these cases an exceptionally high volume of active carbon is necessary to be able to ensure that hydrocarbon fractions are separated out of the separated water during the entire service life of the fuel filter.

SUMMARY

The present invention is concerned with the problem of specifying an improved or at least a different embodiment of a generic fuel filter, which is characterised in particular by an active carbon filter of small volume.

This problem is solved according to the invention by the subject matter of the independent claims. Advantageous embodiments form the subject matter of the dependent claims.

The invention is based on the general idea of providing, in a fuel filter with a water collection chamber for collecting water separated from the fuel and an active carbon filter arranged downstream of the said chamber, a water-soluble dividing device, in particular a water-soluble dividing layer, between the said active carbon filter and the water collection chamber, which dividing device is impermeable or insoluble to fuel, but is easily soluble in water. This has the particular advantage that fuel can initially flow without problems through the fuel filter after installation, that is, at the start of operation, without the fuel coming into direct contact with the active carbon in the active carbon filter and saturating it. If water is increasingly separated out of the fuel to be filtered during relatively long use of the fuel filter, this collects in the water collection chamber and begins to dissolve the dividing device or dividing layer to the active carbon filter. The dissolving of the dividing layer makes it possible for water separated out of the fuel to pass through into the active carbon filter, so that the fuel fractions still present in the separated water can easily be adsorbed in the active carbon filter. In contrast to complex valve devices, which can of course be optionally provided nevertheless, the dividing device according to the invention has the great advantage of effectively protecting the active carbon filter of the fuel filter according to the invention from fuel, in particular during initial startup, so that the volumes of active carbon provided for the active carbon filter can be kept much smaller than would be possible with previously known fuel filters. The water-soluble dividing device or the water-soluble dividing layer is preferably ecologically harmless and can pass through the active carbon filter with the water separated out of the fuel and then be drained into the environment.

In an advantageous development of the solution according to the invention, the water-soluble dividing device or the water-soluble dividing layer contains starch. Starch is not only ecologically but also physiologically harmless, as starch is a polysaccharide with units consisting of glucose. Starch can in particular be obtained in a natural manner, for example as potato starch, and is furthermore an inexpensive substance with virtually unlimited availability. Such starch cannot generally be dissolved or decomposed by fuel, so that it can form a natural and effective barrier to fuel, whereas the dividing layer consisting of starch can be dissolved relatively rapidly, in particular within a few minutes, with ingress of water. The dividing layer dissolved in this manner and consisting of starch can then pass unchecked through the active carbon filter and be drained safely into the environment with the water which has been purified of carbon fractions.

In an advantageous development of the solution according to the invention, the water-soluble dividing device is configured as a membrane or as an inserted part. Dividing devices configured in this manner can be produced in a cost-effective manner and in any desired configuration and in particular can be installed particularly easily between an outlet of the water collection chamber and the downstream active carbon filter. The dividing device can of course be adapted to a wide variety of fuel filters, so that versatile and widespread use is possible.

Further important features and advantages of the invention can be found in the subclaims, the drawing and the associated description of the figures using the drawing.

It is self-evident that the features which are mentioned above and those which are still to be explained below can be used not only in the combination specified in each case, but also in other combinations or alone without departing from the scope of the present invention.

BRIEF DESCRIPTION OF THE DRAWING

A preferred exemplary embodiment of the invention is shown in the drawing and explained in more detail in the following description.

The single FIG. 1 shows a fuel filter according to the invention.

DETAILED DESCRIPTION

According to FIG. 1, a fuel filter 1 according to the invention has a filter housing 2, in which a filter element is arranged, which preferably has an annular configuration. The fuel filter 1 is integrated in a fuel line 4 and is arranged upstream of an internal combustion engine 8. Flow passes through the fuel filter 1 shown according to FIG. 1 radially from the outside to the inside, so that the clean side is on the inside and the inlet side is on the outside. A water collection chamber 5 for collecting water separated out of the fuel is provided below the filter element 3. This water collection chamber 5 is rapidly filled with water during initial startup of the fuel filter 1, which water is then drained into an active carbon filter 6 downstream of the water collection chamber 5, for example at regular intervals. In the active carbon filter 6, the fuel fractions still present in the water separated out of the fuel are bound and prevented from escaping into the environment. After exiting the active carbon filter 6, the separated water can be considered preferably ecologically harmless.

According to the invention, a water-soluble dividing device 7 is provided, which can for example be configured as a water-soluble dividing layer and is arranged essentially between the water collection chamber 5 and the active carbon filter 6 upstream of the latter. The dividing device 7 arranged according to the invention has the following effect: During the initial startup of the fuel filter 1, that is, when it is first filled, the water collection chamber 5 is also first filled with fuel. In the event of unimpeded contact with the active carbon of the active carbon filter 6, the latter would become saturated extremely quickly during the initial startup of the fuel filter 1, for which reason a particularly large volume of active carbon must be provided. However, direct contact of the fuel with the active carbon in the active carbon filter 6 can be prevented by the dividing layer 7 according to the invention, in particular during initial startup of the fuel filter 1, so that the said active carbon filter does not become saturated. Only the water which collects over time in the water collection chamber 5 helps to dissolve the water-soluble dividing device 7, that is, to make it water-permeable, so that the water, which is heavier than fuel, can then flow through the active carbon filter 6. It is not possible for fuel to pass through the dividing device 7.

In an advantageous development of the solution according to the invention, the water-soluble dividing device 7 is formed from starch or at least contains starch. Starch is a natural material which is both ecologically and physiologically harmless and which is resistant to fuel but water-soluble, so that it is particularly suitable for use for the dividing device 7 according to the invention. A further advantage of starch is that starch is available in virtually unlimited quantities, that is, inexpensively and in virtually any desired quality. Furthermore, the dividing layer 7 dissolved by the water collected in the water collection chamber 5 can easily be drained into the environment with the water which passes through the active carbon filter 6. Of course, further valve devices (not shown) can additionally optionally be provided between the water collection chamber 5 and the active carbon filter 6 or downstream of the active carbon filter 6, which valve devices are however not absolutely necessary compared to the prior art. It is also of particular advantage that, by avoiding direct contact of the fuel with the active carbon in the active carbon filter 6 at the start of initial startup of the fuel filter 1, a volume of active carbon in the active carbon filter 6 can be kept much smaller than is the case in conventional active carbon filters. The dividing device 7 according to the invention, which can be produced extremely inexpensively and in virtually any desired embodiment, thus also allows a much smaller active carbon filter 6 to be realised, as a result of which the production costs of the fuel filter 1 can be reduced overall.

The invention claimed is:

1. A fuel filter comprising:
   a filter housing including at least one filter element,
   a water collection chamber configured to collect water separated out of the fuel by the at least one filter element,
   an active carbon filter disposed downstream of the water collection chamber, and
   a water-soluble dividing device disposed between the water collection chamber and the active carbon filter, the water-soluble dividing device being impermeable and insoluble to fuel for preventing the passage of fuel from the water collection chamber into the active carbon filter, the water-soluble dividing device being configured to dissolve when contacted with water to permit the flow of water from the water collection chamber into the active carbon filter upon contact with water.

2. The fuel filter according to claim 1, wherein the water-soluble dividing device contains starch.

3. The fuel filter according to claim 2, wherein the water-soluble dividing device is configured as a membrane.

4. The fuel filter according to claim 1, wherein the water-soluble dividing device is configured as of a membrane.

5. The fuel filter according to claim 1, wherein the fuel filter is arranged upstream of an internal combustion engine.

6. The fuel filter of claim 1, wherein the water-soluble dividing device is a water-soluble dividing layer.

7. A fuel filter comprising:
   a filter housing including at least one filter element,
   a water collection chamber configured to collect water separated out of the fuel by the at least one filter element,
   an active carbon filter disposed downstream of the water collection chamber, and
   a water-soluble dividing device disposed between the water collection chamber and the active carbon filter, the water-soluble dividing device being impermeable and insoluble to fuel;
   wherein the water-soluble dividing device contains starch.

8. The fuel filter according to claim 7, wherein the water-soluble dividing device is configured as a membrane.

9. The fuel filter according to claim 7, wherein the fuel filter is arranged upstream of an internal combustion engine.

10. The fuel filter of claim 7, wherein the water-soluble dividing device is a water-soluble dividing layer.

11. A fuel filter comprising:
    a filter housing,
    at least one filter element disposed in the filter housing for separating water from fuel,
    a water collection chamber disposed in the housing below the filter element configured to collect water separated out of the fuel by the filter element,
    an active carbon filter disposed in the housing below and downstream of the water collection chamber, and
    a water-soluble dividing device disposed in the housing between the water collection chamber and the active carbon filter, the water-soluble dividing device being impermeable and insoluble to fuel to prevent the passage of fuel from the water collection chamber into the active carbon filter, the water-soluble dividing device being configured to dissolve when contacted with water to permit the flow of water from the water collection chamber into the active carbon filter upon contact with water.

12. The fuel filter according to claim 11, wherein the water-soluble dividing device contains starch.

13. The fuel filter of claim 11, wherein the water-soluble dividing device is a water-soluble dividing layer.

* * * * *

UNITED STATES PATENT AND TRADEMARK OFFICE
CERTIFICATE OF CORRECTION

| | |
|---|---|
| PATENT NO. | : 8,636,900 B2 |
| APPLICATION NO. | : 13/055815 |
| DATED | : January 28, 2014 |
| INVENTOR(S) | : Braunheim et al. |

It is certified that error appears in the above-identified patent and that said Letters Patent is hereby corrected as shown below:

In the Claims

Column 4, claim 4, line 15, the word "of" should be deleted.

Signed and Sealed this
Twenty-sixth Day of August, 2014

Michelle K. Lee
*Deputy Director of the United States Patent and Trademark Office*